(12) United States Patent
Whinery

(10) Patent No.: US 6,901,780 B1
(45) Date of Patent: Jun. 7, 2005

(54) STEERING WHEEL AND SEAT SECURITY LOCK

(76) Inventor: Christopher S. Whinery, 15412 Traditions Blvd., Edmond, OK (US) 73013

( * ) Notice: Subject to any disclaimer, the term of this patent is extended or adjusted under 35 U.S.C. 154(b) by 0 days.

(21) Appl. No.: 10/881,222

(22) Filed: Jun. 30, 2004

(51) Int. Cl.[7] ............................................. B60R 25/02
(52) U.S. Cl. .............................. 70/209; 70/225; 70/261
(58) Field of Search ........................ 70/209–212, 237, 70/238, 261, 225, 226; 296/69; 297/219.1, 297/220, 378.13, 378.14

(56) References Cited

U.S. PATENT DOCUMENTS

| | | | |
|---|---|---|---|
| 4,116,297 A | * 9/1978 | Ross et al. ................... | 180/287 |
| 4,304,110 A | 12/1981 | Fain | |
| 5,014,529 A | 5/1991 | Wu | |
| 5,028,086 A | * 7/1991 | Smith .......................... | 296/69 |
| 5,213,388 A | * 5/1993 | Baker ....................... | 296/65.13 |
| 5,251,465 A | * 10/1993 | Hwang ......................... | 70/209 |
| 5,277,043 A | * 1/1994 | Inashvili ...................... | 70/238 |
| 5,345,796 A | * 9/1994 | Chieh et al. .................. | 70/202 |
| 5,406,813 A | * 4/1995 | Lo ............................... | 70/209 |
| 5,460,021 A | * 10/1995 | Taylor ......................... | 70/209 |
| 5,628,215 A | * 5/1997 | Brown ......................... | 70/261 |
| 5,644,937 A | * 7/1997 | Farino ......................... | 70/261 |
| 5,737,949 A | * 4/1998 | Zenke ......................... | 70/209 |
| 5,816,658 A | 10/1998 | Wallis | |
| 5,829,283 A | * 11/1998 | Zenke ......................... | 70/209 |
| 5,911,765 A | * 6/1999 | DaSilva ....................... | 70/202 |
| 5,964,109 A | * 10/1999 | Zenke ......................... | 70/209 |
| 6,003,350 A | * 12/1999 | Sentner, Jr. .................. | 70/202 |
| 6,439,012 B1 | 8/2002 | Chen | |
| 6,578,395 B2 | 6/2003 | Takerian | |
| 6,668,604 B1 | 12/2003 | Hsieh | |

* cited by examiner

*Primary Examiner*—Suzanne Dino Barrett
(74) *Attorney, Agent, or Firm*—Randal D. Homburg

(57) ABSTRACT

A steering wheel and seat security lock is provided to attach a lower portion of a raised steering wheel of an automobile to an upper portion of an automobile driver's seat which has been tilted forward towards the steering wheel, the lock having a steering wheel engaging portion having a hook on a first end attaching to the steering wheel and a seat engaging portion having a second end embodied as either a pair of descending arms adapted to insert within the holes provided to retain vertical headrest support arms or having a cross member attached behind the vertical headrest support arms, a support bracket extending to the top of a lowered headrest, and another support bracket behind a back surface of the driver's seat, the steering wheel engaging portion slidably engaging the seat engaging portion, further providing a lock mechanism to retain the steering wheel engaging portion and the seat engaging portion in a closed and locked position, restricting space between the upper portion of the driver's seat and the steering wheel as a deterrent to theft of the automobile.

4 Claims, 5 Drawing Sheets

STEERING WHEEL AND SEAT SECURITY LOCK

CROSS REFERENCE TO RELATED APPLICATIONS

None

I. BACKGROUND OF THE INVENTION

1. Field of Invention

A steering wheel and seat security lock is provided to attach a lower portion of a raised steering wheel of an automobile to an upper portion of an automobile driver's seat which has been tilted forward towards the steering wheel, the lock having a steering wheel engaging portion having a hook on a first end attaching to the steering wheel and a seat engaging portion having a second end embodied as either a pair of descending arms adapted to insert within the holes provided to retain vertical headrest support arms or having a cross member attached behind the vertical headrest support arms, a support bracket extending to the top of a lowered headrest, and another support bracket behind a back surface of the driver's seat, the steering wheel engaging portion slidably engaging the seat engaging portion, further providing a lock mechanism to retain the steering wheel engaging portion and the seat engaging portion in a closed and locked position, restricting space between the upper portion of the driver's seat and the steering wheel as a deterrent to theft of the automobile.

2. Description of Prior Art

The following United States patents were discovered and are disclosed within this application for utility patent. All relate to steering wheel locks for theft deterrence and prevent rotation of the steering wheel, attaching solely to the steering wheel.

One of the earlier steering wheel patents, U.S. Pat. No. 4,304,110 to Fain, discloses an extendable bar which has a first hook attached to one side of a steering wheel with another hook being locked to the opposite side of the steering wheel, with the bar extending beyond the circumference of the steering wheel to prevent the wheel from being turned when the bar is applied. A similar technology is used in U.S. Pat. Nos. 6,668,604 to Hsieh and 5,014,529 to Wu.

In U.S. Pat. No, 6,578,395 to Takerian, a locking bar is attached to two different points across the seating area of a vehicle, blocking access to the driver's seat, specifically to a golf cart of other rental vehicle, the lock-out assembly having a first and second end fixed to the chassis and extending over the body support to discourage use of the seat, one aspect having and first end and second end fixed to the seat with a shield disposed over the body support, with each end forming an attachable hook which attaches to some part of the vehicle. In U.S. Pat. No. 6,439,012 to Chen, a brake pedal lock is disclosed. A headrest lock is disclosed in U.S. Pat. No. 5,816,658, which is similar to the headrest being used in the intended seats of the present security lock.

The above patents are not adapted, as is the present security lock, to attach the upper portion of the folding seat of an automobile to the steering wheel, making it practically impossible to become seated behind the steering wheel of the applied automobile when the lock is applied, as the seat is as far forward as possible and cannot be folded back with the lock applied attaching the upper portion of the folding seat to the lower portion of the steering wheel.

II. SUMMARY OF THE INVENTION

Vehicle theft occurs daily. The automobile security business offers several theft deterrent devices, some disclosed above, which have tried to prevent stolen vehicles. Locking bars attach to steering wheels to prevent rotation of the steering wheels. Brake pedal locks have been patented to prevent use of the automobile pedals. Other patents have tried covering access to the driver seat of a vehicle. However, none of them have disclosed a locking device which allows a user to fold the driver's seat forward and lock it into a forward position to the steering wheel of the vehicle. If a thief cannot fold the seat back and release the seat from attaching to the steering wheel, at least some deterrence would arise in it taking time to dismantle the locking device before a thief could drive the vehicle away after bypassing the ignition system to operate the vehicle. It would also be visible from the outside of the automobile prior to entry.

It is therefore the primary objective of the invention is to provide a security locking device to lockably attach the upper portion of the drivers seat, which has been tilted into a forward position to the lower portion of the steering wheel, making the space between the driver's seat and steering wheel too small for a driver to fit between the drivers seat and the steering wheel to operate the vehicle without removal of the security locking device.

A second objective is to place the applied security locking device in a position where the applied device locking the driver's seat against the steering wheel is visible through the driver's side window to deter any initial attempt of theft.

A third objective of the vehicle is to attach the security device through the upper headrest on the driver's seat with a means of securing the device to retain the headrest is in a lowered position, across the vertical headrest support bars and against the back of the driver's seat on a seat engaging end and on the steering wheel engaging end, by a hook, with the steering wheel end and the seat engaging ends slideably and lockingly engaging each other.

A fourth objective is to provide the security locking device where the steering wheel end has a hook and the seat engaging end has two descending bars adapted to replace the vertical headrest support bars, removing the headrest from the driver's seat during use of the device, thus attaching the seat engaging end within the two holes suited for the vertical headrest support bars.

III. DESCRIPTION OF THE DRAWINGS

The following drawings are submitted with this utility patent application.

FIG. 6 is a side view of a second embodiment of the lock device securing the upper portion of a driver's seat to the lower portion of a steering wheel with the seat securing portion adapted to be inserted within the holes in the top of the driver's seat which retain vertical headrest supports of a headrest.

IV. DESCRIPTION OF THE PREFERRED EMBODIMENT

Figure 1:
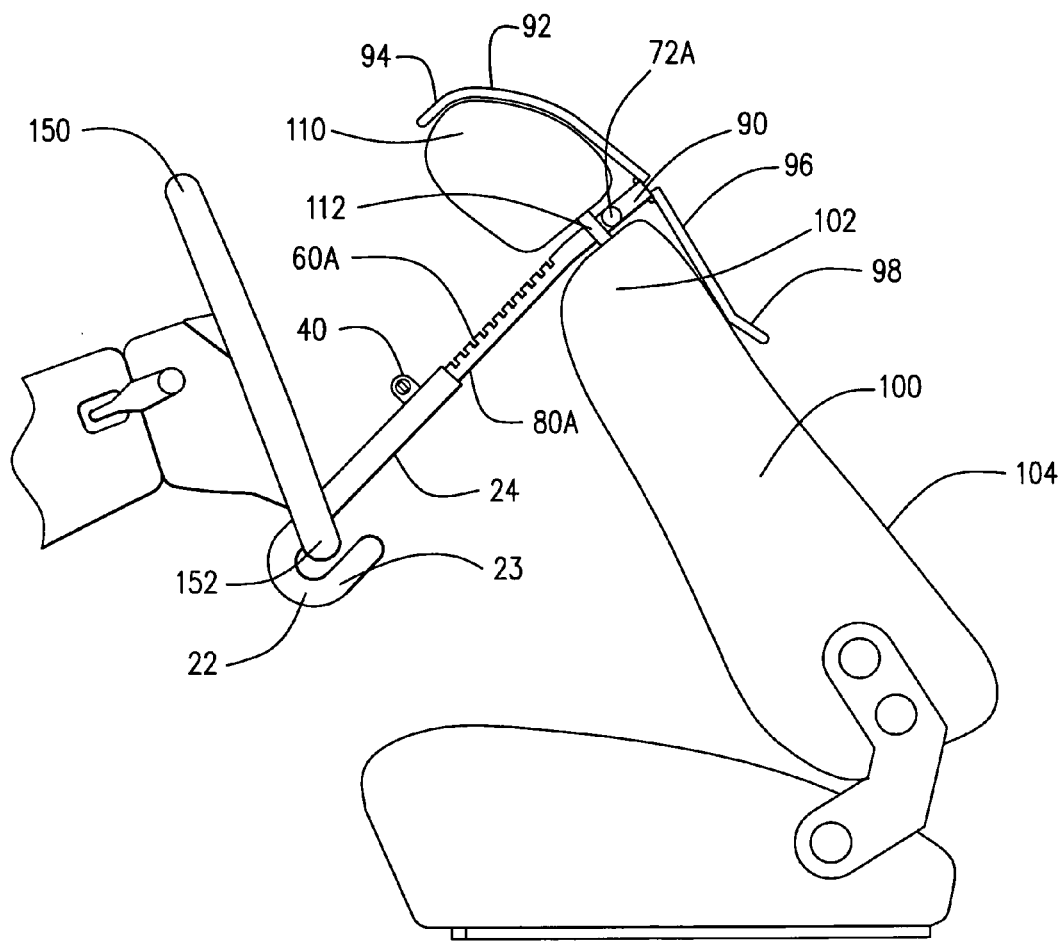
FIG. 1 is a side view of a first embodiment of the lock device securing the upper portion of a driver's seat to the lower portion of a steering wheel with the seat securing portion in the extended and attached position.

A security lock device 10, shown in FIGS. 1–7 of the drawings, engaging an automobile folding driver's seat 100 including a headrest 110 having legs 112 attaching the headrest 110 to an upper portion 102 of the driver's seat 100, and a steering wheel 150, locks and retains the driver's seat 100 in a folded forward position up against or near the steering wheel 100 preventing access behind the steering wheel 100 in order for an unauthorized person to operate the automobile, the device 10 comprising a steering wheel engaging segment 20 having a first end 22 forming a hook portion 23 and a second end 24 which slidably engages a second end 80a, 80b of a seat engaging segment 60a, 60b, the seat engaging segment 60a, 60b also including a first end 70a, 70b attaching to the upper portion 102 of the forward folded drivers seat 100, the steering wheel engaging segment 20 further providing a locking means 40 which locks the second end 24 of the steering wheel engaging segment 20 to the second end 80a, 80b of the seat engaging segment 60a, 60b with a key, preventing separation and dislodging of the device 10 once locked at a most reduced length. When attached, not only should the device 10 thwart a thief from being able to operate the automobile, it should also prevent ready access to other automobile accessories, including dashboard mounted items, from access from the driver's side of the automobile.

Figure 2:
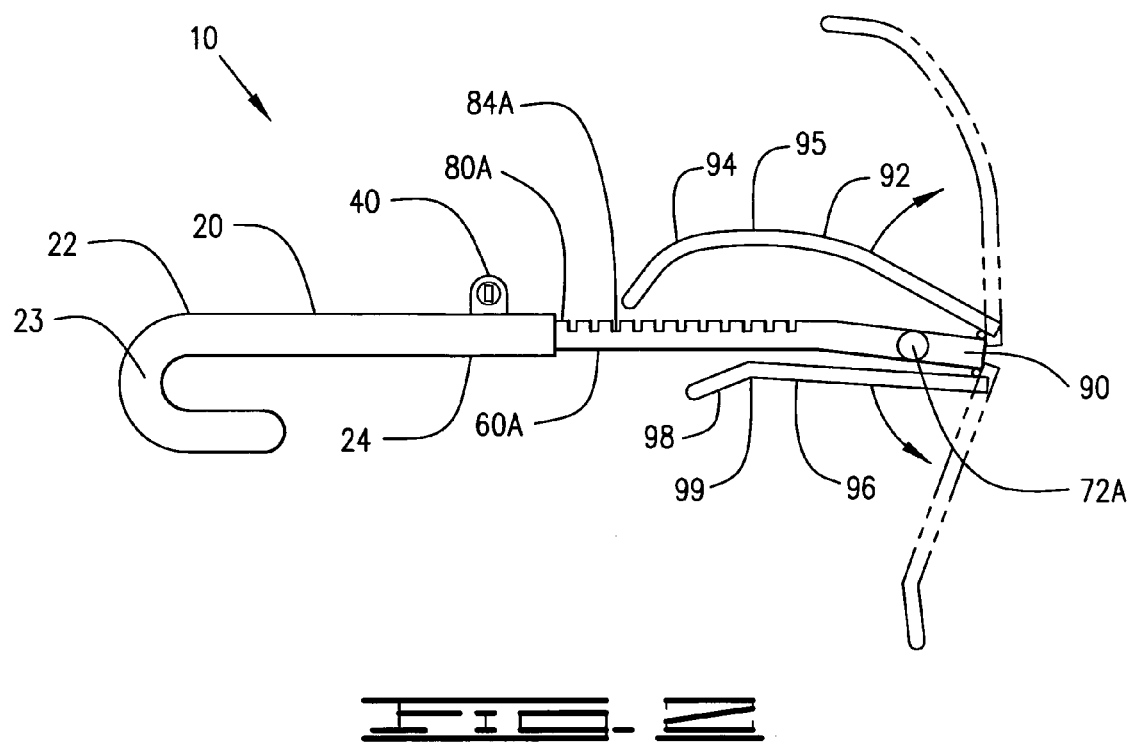
FIG. 2 is a side view of the first embodiment with the seat engaging portion in a collapsed and reduced position.
Figure 3:
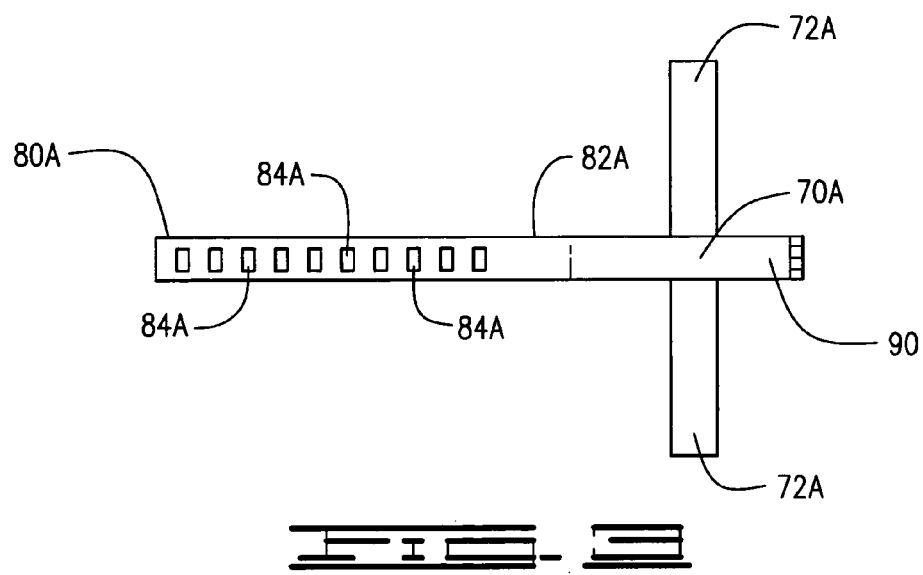
FIG. 3 is an upper view of the seat engaging portion of the first embodiment.
Figure 4:
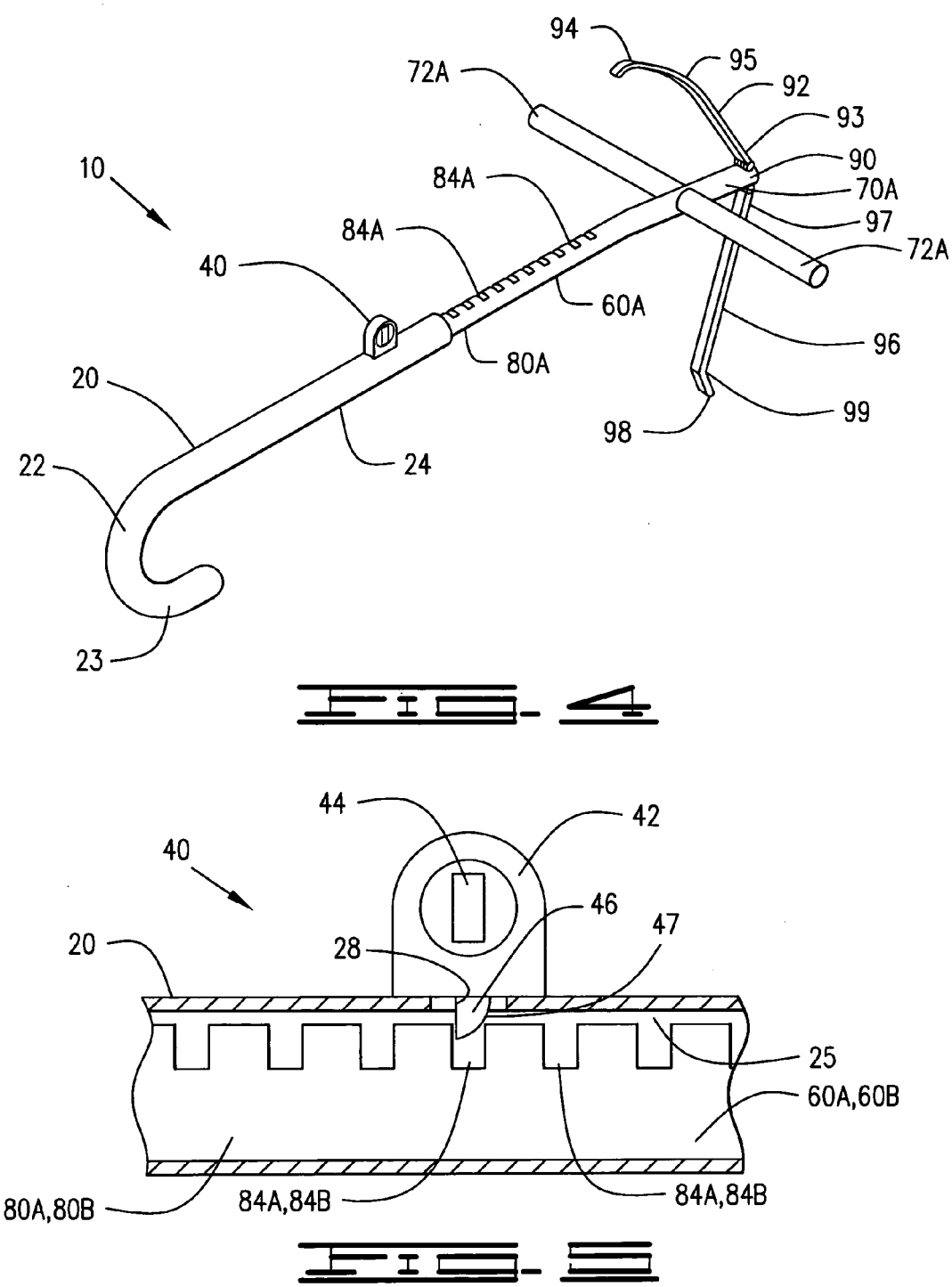
FIG. 4 is an upper perspective of the first embodiment
Figure 5:
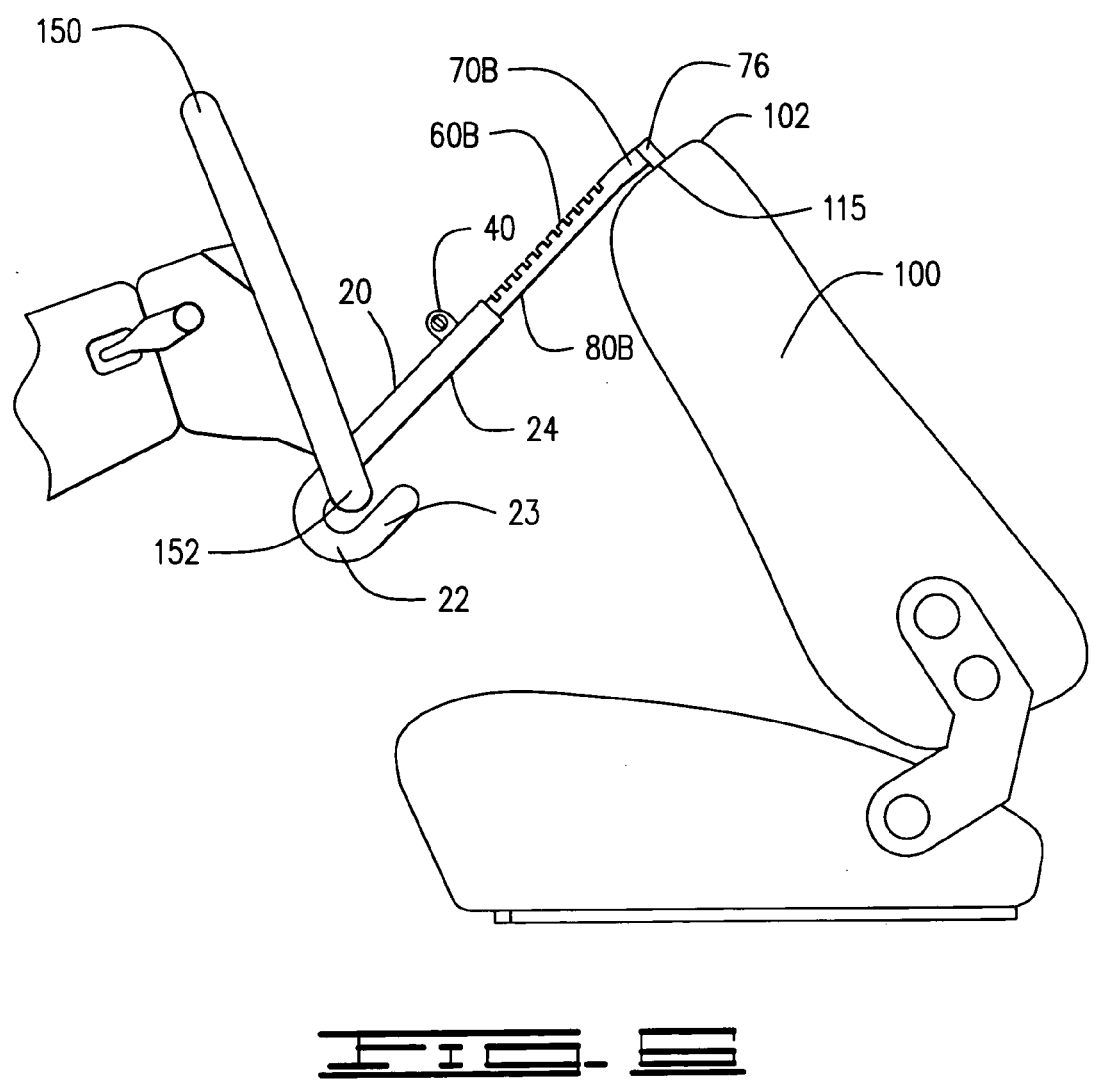
FIG. 5 is a side cross section of the locking means.

The seat engaging segment 60a, 60b is provided in two more specific embodiments. In a first embodiment 60a, shown in FIGS. 1–4, the seat engaging segment 60a further comprises the second end 80a having an outer surface 82a including a plurality of spaced lateral locking slots 84a, the first end 70a including a pair of lateral arms 72a extending perpendicular from the first end 70a, FIG. 2, and a terminal end 90 having a upward hinged headrest retaining extension 92 and a downward hinged seat retaining extension 96, with the headrest retaining extension 92 and seat retaining extension 96 folding against the seat retaining segment 60a, but folding outward to no more than a 90 degree angle from the seat retaining segment 60a. FIG. 2 indicates the seat retaining segment 60a in its folded state, preferable when stored, while FIG. 4 represents the expanded state, which is the configuration of the device 10 when locking the steering wheel 150 to the driver's seat 100, as indicated in FIG. 1. The headrest retaining extension 92 further includes an inner end 93 hingably attached to the terminal end 90 and an upper end 94 having an inward bend 95, adapted to the headrest 110, to prevent the headrest 110 from being raised or removed when the device 10 is attached, FIG. 1. The seat retaining extension 96 has an inner end 97 hingably attached to the terminal end 90 and a lower end 98 having an outward bend 99, adapted to a back surface 104 of the driver's seat 100.

Figure 7:
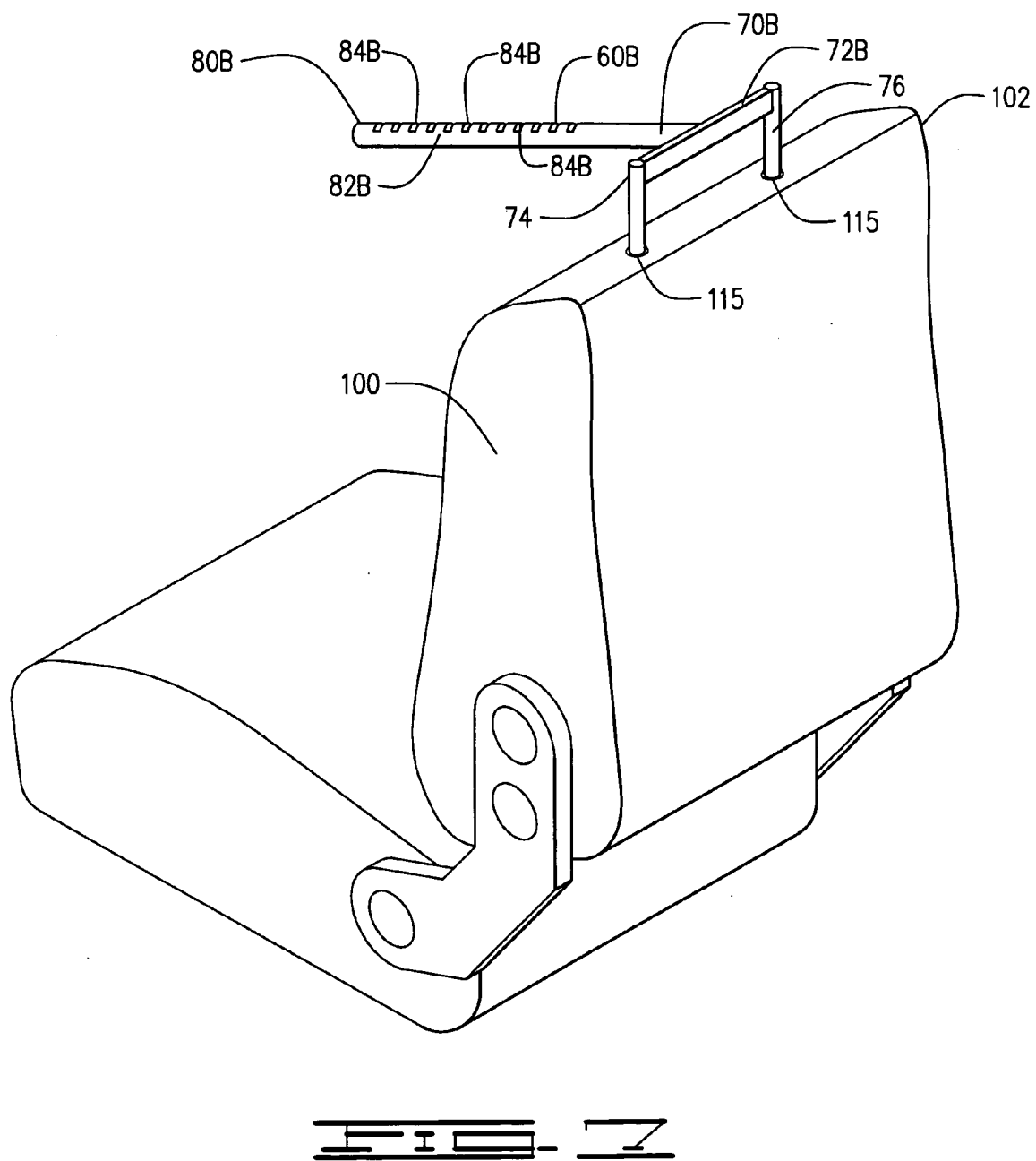
FIG. 7 is an upper perspective view of the seat engaging portion engaging the holes in the top of the driver's seat which retain vertical headrest supports of a headrest.

In the second embodiment, shown in FIGS. 6 and 7, the seat engaging segment 60b further comprises the second end 80b also having an outer surface 82b including a plurality of spaced lateral locking slots 84b, the first end 70b having a perpendicular cross member 72b with two ends 74 forming downward headrest support engaging extensions 76, adapted to be inserted into a headrest support 115 on the upper portion 102 of the driver's seat 100 in place of the headrest 110. FIG. 6 indicates the configuration of the device 10 when locking the steering wheel 150 to the driver's seat 100, while FIG. 7 shows an alternate view of the first end 70b attached within the headrest support 115 in the upper portion 102 of the driver's seat 100.

The locking means 40 is more specifically shown in FIG. 4 as having a lock housing 42 attached to the second end 24 of the steering wheel engaging segment 20 containing a rotatable lock member 44 which forces a lock pawl 46 through a bore 28 in the second end 24 into an inner cavity 25 in the second end 24. The outer surface 82a, 82b of the second end 80a, 80b of the seat engaging segment 60a, 60b closely conforms to the inner cavity 25 of the second end 24 of the steering wheel engaging segment 20, with the two second ends 24, 80a, 80b slidably engaging one another, allowing the second end 80a, 80b of the seat engaging segment 60a, 60b to be drawn within the second end 24 of the steering wheel segment 20, wherein the lock pawl 46 may be inserted within any of the plurality of spaced lateral locking slots 84a, 84b in the second end 80a, 80b of the seat engaging segment 60a, 60b, locking the seat engaging segment 60a, 60b and steering wheel engaging segment 20 at a fixed length. It would be preferred that the locking means 40 would allow for reduction of length of the device without requiring activity with the lock means 40, but require the active disengagement of the lock pawl 46 to expand the length of the device 10, as would be provided for in FIG. 5, with the lock pawl 46 having a taper 47 to one side.

Application of the device 10 to the steering wheel 150 and driver's seat 100 would be performed by the following steps. Using the device 10 including the first embodiment of the seat engaging segment 60a, the steering wheel 150 would be raised to is greatest height and the upper portion 102 of the driver's seat 100 would be tilted forward while the driver's seat 100 would be moved forward, making the steering wheel 150 as close to the upper portion 102 of the driver's seat 100 as possible. The first end 22 of the steering wheel segment 20 is passed between the legs 112 of the headrest 110 between the headrest 110 and the upper portion 102 of the driver's seat 100. The headrest retaining extension 92 and seat retaining extension 96 are folded outward from the terminal end 90 of the seat engaging segment 60a, after which the hook portion 23 on the steering wheel engaging segment 20 is engaged with a lowest portion 152 of the steering wheel 150. The steering wheel engaging segment 20 and the seat engaging segment 60a are slid together as far as possible. The lock means 40 is then engaged, locking the device 10 at its most reduced length. Disengagement simply requires unlocking the locking means 40 and sliding the device 10 apart, after which the device 10 may be collapsed and stored until later use.

Using the device including the second embodiment of the seat engaging segment 60b, the steering wheel 150 would be raised to is greatest height and the upper portion 102 of the driver's seat 100 would be tilted forward and the driver's seat 100 would be moved forward, making the steering wheel 150 as close to the upper portion 102 of the driver's seat 100 as possible. The headrest 110 of the driver's seat 100 would be removed and stored. The headrest engaging extensions 76 would then be inserted within the headrest support 115, after which the hook portion 23 would be engaged with the lowest portion 152 of the steering wheel 150. The steering wheel engaging segment 20 and the seat engaging segment 60b are slid together as far as possible. The lock means 40 is then engaged, locking the device 10 at its most reduced length. Disengagement simply requires unlocking the locking means 40 and sliding the device 10 apart, after which the device 10 may be stored until later use.

Although the device 10 is shown as having an overall cylindrical shaped, it could be square tubing or any other shape, as long as the second end 24 of the steering wheel engaging segment 20 and the second end 80a, 80b of the seat engaging segment 60a, 60b conform and are slidably engaged. It may also be useful to provide a coating to the first end 22 of the steering wheel engaging segment 20 and the seat engaging segment 60a, 60b to prevent rough contact between the automobile components and the device 10. It is also recommended that the device 10 be provided is a bright color to give a visual indication from outside the automobile that the device 10 has been applied to deter damaging entry by a thief, with hopes that the visual recognition of the applied device 10 would thwart even an initial attempt to steal the automobile.

In addition, although seldom seen in modern automobiles, it is contemplated that the device 10 could be adapted to attach to a secure a headrest 110 on a single leg as opposed to a pair of legs 112 by making at least one of the lateral arms 72a a curved hook which would engage the single leg, although this embodiment is not shown in the drawings or contained in the below claims.

While the device has been particularly shown and described with reference to a preferred embodiment thereof, it will be understood by those skilled in the art that changes in form and detail may be made therein without departing from the spirit and scope of the device.

What is claimed is:

1. An automobile security lock device locking an upper portion of a folding driver's seat including a headrest having legs attaching the headrest, to a steering wheel, locks and retains the driver's seat in a folded forward position up against or near the steering wheel preventing access behind the steering wheel in order for an unauthorized person to operate the automobile, the device comprising:

a steering wheel engaging segment having a first end forming a hook portion and a second end;

a seat engaging segment having a second end slideably engaging said second end of said steering wheel engaging segment, said seat engaging segment also including a first end attaching to said upper portion of said forward folded drivers seat, said second end having an outer surface including a plurality of spaced lateral locking slots, said first end including a pair of lateral arms extending perpendicular from said second end, and a terminal end having an upward hinged headrest retaining extension and a downward hinged seat retaining extension, with said headrest retaining extension and seat retaining extension folding against said seat retaining segment, but folding outward to no more than a 90 degree angle from said seat retaining segment, said headrest retaining extension includes an inner end hingably attached to said terminal end and an upper end having an inward bend, adapted to said headrest, to prevent said headrest from being raised or removed when said device is attached, and said seat retaining extension has an inner end hingably attached to said terminal end and a lower end having an outward bend, adapted to a back surface of said driver's seat; and a locking means locking said second end of said steering wheel engaging segment to said second end of said seat engaging segment, preventing separation and dislodging of said device once locked.

2. An automobile security lock device locking an upper portion of a folding driver's seat including a headrest having legs attaching the headrest, to a steering wheel, locks and retains the driver's seat in a folded forward position up against or near the steering wheel preventing access behind the steering wheel in order for an unauthorized person to operate the automobile, the device comprising:

a steering wheel engaging segment having a first end forming a hook portion and a second end;

a seat engaging segment having a second end slideably engaging said second end of said steering wheel engaging segment, said seat engaging segment also including a first end attaching to said upper portion of said forward folded drivers seat, said second end having an outer surface including a plurality of spaced lateral locking slots, and said first end having a perpendicular cross member with two ends forming downward headrest support engaging extensions, adapted to be inserted into a headrest support on said upper portion of the driver's seat in place of the headrest; and a locking means locking said second end of said steering wheel engaging segment to said second end of said seat engaging segment, preventing separation and dislodging of said device once locked.

3. An automobile security lock device locking an upper portion of a folding driver's seat including a headrest having legs attaching the headrest, to a steering wheel, locks and retains the driver's seat in a folded forward position up against or near the steering wheel preventing access behind the steering wheel in order for an unauthorized person to operate the automobile, the device comprising:

a steering wheel engaging segment having a first end forming a hook portion and a second end defining an inner cavity;

a seat engaging segment having a second end having an outer surface including a plurality of spaced lateral locking slots, a first end including a pair of lateral arms extending perpendicular from said first end, and a terminal end having an upward hinged headrest retaining extension and a downward hinged seat retaining extension, with said headrest restraining extension and seat retaining extension folding against said seat retaining segment, but folding outward to no more than a 90 degree angle from said seat retaining segment, said headrest retaining extension includes an inner end hingably attached to said terminal end and an upper end having an inward bend, adapted to said headrest, to prevent said headrest from being raised or removed when said device is attached, and said seat retaining extension has an inner end hingably attached to said terminal end and a lower end having an outward bend, adapted to a back surface of said driver's seat; and a lock housing attached to said second end of said steering wheel engaging segment containing a rotatable lock member which forces a lock pawl through a bore in said second end into said inner cavity in said second end, said outer surface of said second end of said seat engaging segment closely conforming to said inner cavity of said second end of said steering wheel engaging segment, with said two second ends slidably engaging one another, allowing said second end of said seat engaging segment to be drawn within said second end of said steering wheel segment, wherein said lock pawl may be inserted within any of said plurality of spaced lateral locking slots in said second end of said seat engaging segment, locking said seat engaging segment and steering wheel engaging segment.

4. An automobile security lock device locking an upper portion of a folding driver's seat including a headrest having legs attaching the headrest, to a steering wheel, locks and retains the driver's seat in a folded forward position up against or near the steering wheel preventing access behind the steering wheel in order for an unauthorized person to operate the automobile, the device comprising:

a steering wheel engaging segment having a first end forming a hook portion and a second end defining an inner cavity;

a seat engaging segment including a second end having an outer surface including a plurality of spaced lateral locking slots, and a first end having a perpendicular cross member with two ends forming downward headrest support engaging extensions, adapted to be inserted into a headrest support on said upper portion of the driver's seat in place of the headrest; and a lock housing attached to said second end of said steering wheel engaging segment containing a rotatable lock member which forces a lock pawl through a bore in said second end into said inner cavity in said second end, said outer surface of said second end of said seat engaging segment closely conforming to said inner cavity of said second end of said steering wheel engaging segment, with said two second ends slidably engaging one another, allowing said second end of said seat engaging segment to be drawn within said second end of said steering wheel segment, wherein said lock pawl may be inserted within any of said plurality of spaced lateral locking slots in said second end of said seat engaging segment, locking said seat engaging segment and steering wheel engaging segment.

\* \* \* \* \*